UNITED STATES PATENT OFFICE.

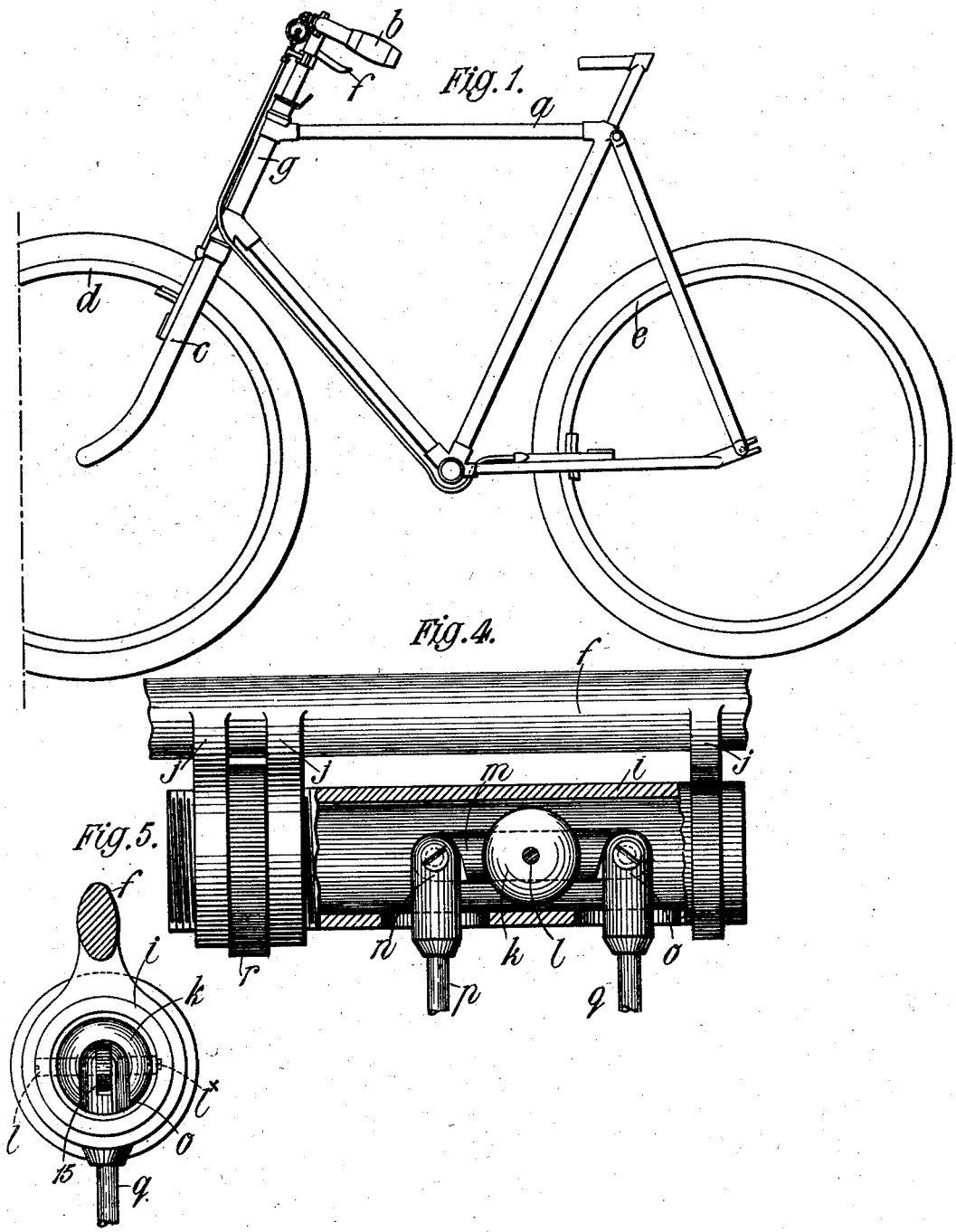

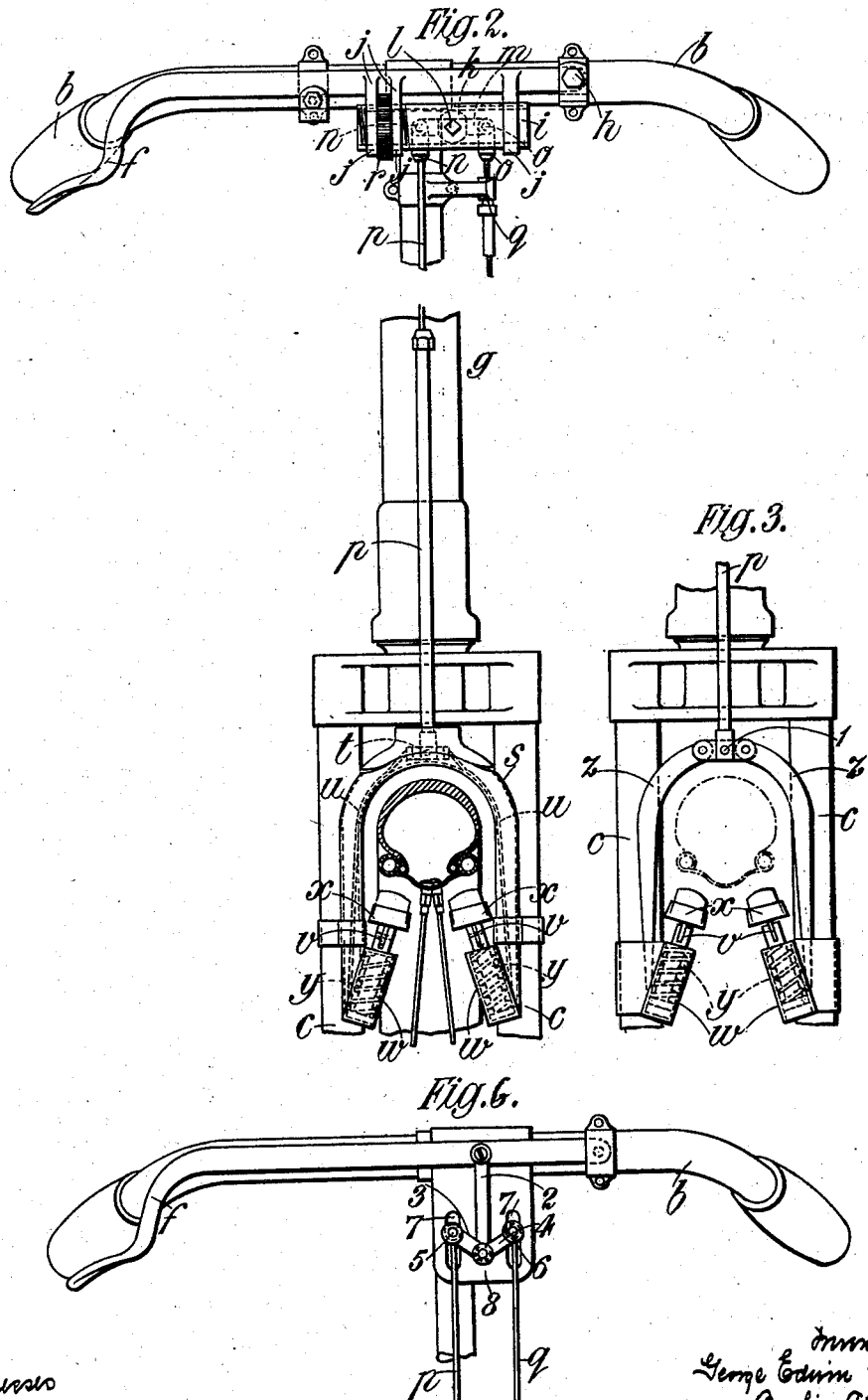

GEORGE EDWIN BENNETT, OF CROYDON, ENGLAND.

BRAKE MECHANISM FOR CYCLES, MOTOR-CARS, &c.

SPECIFICATION forming part of Letters Patent No. 702,337, dated June 10, 1902.

Application filed March 10, 1902. Serial No. 97,524. (No model.)

*To all whom it may concern:*

Be it known that I, GEORGE EDWIN BENNETT, a subject of His Majesty the King of Great Britain, residing at Croydon, in the county of Surrey, England, have invented new and useful Improved Brake Mechanism Applicable to Cycles, Motor-Cars, and Road-Vehicles, of which the following is a specification.

This invention relates to improved brake mechanism applicable to cycles, motor-cars, and other road-vehicles, and has for its objects to provide means whereby a better application of the braking power to one or more wheels is obtained through the operation of one lever, to supply means whereby any slack in the connections may be taken up or let out, and to provide an improved form of brake-stirrup, all of which improvements are hereinafter more particularly described and claimed.

In the accompanying drawings, Figure 1 shows a side elevation of a cycle having the braking device fitted to the front and rear wheels, respectively. Fig. 2 shows a front view of the handle-bars, head, and forks with brake attached, on an enlarged scale. Fig. 3 is a similar view of the head and forks, illustrating a modified form of brake-stirrup. Fig. 4 shows an enlarged view of the power-distributing device and casing, partly sectional. Fig. 5 shows a side view of the device illustrated in Fig. 4. Fig. 6 shows a modified construction of the power-distributing device.

Referring to the drawings, $a$ indicates the frame, $b$ the handle-bars, $c$ the front fork, $d$ the front-wheel rim, $e$ the rear-wheel rim, $f$ the brake-lever, and $g$ the head, of a bicycle. All these parts are shown merely to illustrate the application of my invention and may be of any suitable shape or kind.

Referring first to the construction illustrated in Figs. 1 to 5, the brake-lever $f$, pivoted at $h$, supports the tubular piece $i$ by means of the brackets $j$. This tubular piece $i$ forms an adjustable support for a ball $k$, which is pivoted within it upon the trunnions $l\,l^x$. These trunnions are both screwed into the ball $k$ from the same side, the one indicated by the reference-letter $l$ being screwed through from the opposite side, while the other, which also serves the purpose of a set-screw, is screwed into its place after the parts are in position. The ball $k$ is provided with a hole, which is normally coaxial with the said tubular piece $i$ and within which (hole) is located a rod $m$, to whose extremities are pivoted the sockets $n\,o$, in which are secured the connections $p\,q$, through which power is transmitted to the front and rear wheel brakes, respectively. The rod $m$ is clamped to the ball $k$, within which it may be adjusted by means of a set-screw $l^x$, so that it may distribute the power imparted to it by the brake-lever to the brake connections in proportions controlled by their respective distances from the trunnions $l$ of the ball $k$, which are also the points about which the said rod turns. The tubular piece $i$ is screw-threaded at one end and is there provided with a milled adjusting-nut $r$, which is located between two of the brackets $j$. By means of this nut the position of the ball $k$, which is pivoted within the tubular part $i$, may be adjusted along the rod $m$ after its clamping-screw has been slacked back for the purpose, the action of the brakes when the distributing device is so adjusted that the ball or trunnions are in closer proximity to the rear-wheel connection than to that of the front wheel being that power is first transmitted to the rear wheel, whose momentum is thereby gradually checked until the front-wheel brake is applied, whereupon the power on both wheels will be differentially increased.

In Fig. 2 is shown one method of operating the front-wheel brake-blocks. The tubular stirrup $s$ contains the extremity of the rod or wire $p$, to which connections are preferably united by a pivoted connection at $t$. Each of these connections $u$ passes through one of the tubular legs of the brake-stirrup $s$ to a brake-block slide $v$, which is adapted to travel in a suitable guideway $w$, formed at the end of each stirrup-leg. These guideways $w$, which support the stirrup $s$, are suitably clamped to the forks $c$, as shown in Fig. 3. The brake-blocks $x$ are pivoted to the ends of their respective slides $v$ and are normally held out of engagement with the wheel-rim by a spiral spring $y$, that surrounds each of the slides $v$ within its guideway $w$.

The connection to the rear wheel will be obvious from Fig. 1. The rear connection $q$ may pass in the manner shown in that figure and be connected by any flexible connection with the brake substantially in the manner shown for the front wheel, or any other suitable means may be employed whereby the operation of the back brake can be effected with certainty as and when required.

According to Fig. 3, which illustrates a modified form of front-wheel brake, the tubular stirrup shown in Fig. 2 is omitted, and curved bars $z$, pivoted at 1, are employed in the place of the flexible connections $u$. The curved bars $z$ are pivotally connected to the brake-block slides $v$, through which the brake is applied against the pressure of the springs $y$.

Fig. 6 illustrates a modification whereby the action of the brakes is made self-adjustable. The lifting of the brake-handle $f$ is communicated directly by means of the pivoted bar 2 to the two levers 3 4. These levers are pivoted both to the bar 2 and to the socket-pieces 5 6 of the brake connections, which are adapted to slide in slots $f$, formed in the plate 8, supported by the handle-bars $b$. In this way either of the brakes can act more or less independently of the other when engaged by an irregular part of the rim.

In applying my invention to vehicles having more than two wheels one or more supplementary power-distributing rods are suitably connected to the one already described, in which case the various brake connections would be secured to the outer ends of these supplementary distributing-rods.

Obviously the relative distances of the brake connections from the trunnions of the distributing-rods may be varied by adjusting the respective positions of such connections instead of that of those of the trunnions.

Throughout the specification I have referred to "brake-blocks;" but I wish it to be understood that the application to brake pads, bands, or straps is within the scope of my invention.

What I claim, and desire to secure by Letters Patent of the United States, is—

1. A brake, comprising in combination, a suitably-fulcrumed operating-lever, an adjustably-fulcrumed power-distributing rod, an operated part in proximity to each wheel, a connection extending from the opposite ends of said adjustably-fulcrumed power-distributing rod to the operated parts and means for adjusting the fulcrum relatively to the opposite ends of said power-distributing rod, substantially as described.

2. A brake comprising, in combination, a lever, brackets upon said lever, a tubular part supported by said brackets, a rod adjustably fulcrumed to said tubular part, means serving to adjust said tubular part and the supported fulcrum of the rod relatively to said rod, an operated part in proximity to each wheel, and a connection extending from each operated part to opposite ends of said rod, substantially as described.

3. The combination of a bifurcated tubular guide whose legs straddle the wheel-rim, and which are provided with guideways at their ends, brake-blocks sliding in said guideways; springs for disengaging the brakes from the wheel, and flexible connections which pass through the tubular guides to the brake-block slides, substantially as described.

4. A brake comprising, in combination, a lever, brackets upon said lever, a tubular part supported by said brackets, a rod adjustably fulcrumed to said tubular part, means serving to adjust said tubular part and the supported fulcrum of the rod relatively to said rod, a brake-stirrup consisting of a bifurcated tubular guide in proximity to each wheel, a slide-guideway at the extremity of each of said stirrup-legs, slides located in such guideways, bifurcated connections extending from the opposite ends of said adjustably-fulcrumed rod to the said slides, and brake-blocks pivoted to said slides, substantially as described.

In testimony whereof I have hereunto subscribed my name.

GEORGE EDWIN BENNETT.

Witnesses:
J. S. WITHERS,
WALTER J. SKERTEN.